United States Patent
Tervonen et al.

(10) Patent No.: US 11,811,608 B2
(45) Date of Patent: Nov. 7, 2023

(54) NETWORK SLICING IN RADIO INTERFACE

(71) Applicant: Nokia Technologies Oy, Espoo (FI)

(72) Inventors: Janne Tervonen, Espoo (FI); Mika Kasslin, Espoo (FI); Olli Alanen, Vantaa (FI); Jari Mustajärvi, Espoo (FI); Thomas Höhne, Helsinki (FI); Cinzia Sartori, Pullach (DE)

(73) Assignee: Nokia Technologies Oy, Espoo (FI)

( * ) Notice: Subject to any disclaimer, the term of this patent is extended or adjusted under 35 U.S.C. 154(b) by 375 days.

(21) Appl. No.: 17/278,237

(22) PCT Filed: Oct. 26, 2018

(86) PCT No.: PCT/FI2018/050779
§ 371 (c)(1),
(2) Date: Mar. 19, 2021

(87) PCT Pub. No.: WO2020/084189
PCT Pub. Date: Apr. 30, 2020

(65) Prior Publication Data
US 2021/0359912 A1    Nov. 18, 2021

(51) Int. Cl.
*H04L 41/08* (2022.01)
*H04L 41/0893* (2022.01)
*H04W 28/16* (2009.01)
*H04W 48/16* (2009.01)
*H04L 61/5076* (2022.01)
*H04L 101/622* (2022.01)

(52) U.S. Cl.
CPC ...... *H04L 41/0893* (2013.01); *H04L 61/5076* (2022.05); *H04W 28/16* (2013.01); *H04W 48/16* (2013.01); *H04L 2101/622* (2022.05)

(58) Field of Classification Search
CPC ............. H04L 41/0893; H04L 61/5076; H04L 2101/622; H04L 41/0894; H04L 41/0897; H04L 41/08; H04W 28/16; H04W 48/16; H04W 48/18; H04W 24/02
See application file for complete search history.

(56) References Cited

U.S. PATENT DOCUMENTS

| | | | |
|---|---|---|---|
| 7,593,375 B2 | 9/2009 | Seo et al. | |
| 10,111,163 B2 | 10/2018 | Vrzic et al. | |
| 2018/0270666 A1 | 9/2018 | Lee et al. | |
| 2018/0270743 A1* | 9/2018 | Callard | H04W 28/0268 |
| 2019/0028943 A1* | 1/2019 | Wang | H04W 8/065 |
| 2019/0124572 A1* | 4/2019 | Park | H04W 36/08 |

OTHER PUBLICATIONS

Office action received for corresponding European Patent Application No. 18803456.5, dated Mar. 22, 2023, 8 pages.
"Network Slicing—Understanding Wi-Fi Capabilities", Wireless Broadband Alliance (WBA) 5G Workgroup, Apr. 2018, 15 pages.
(Continued)

*Primary Examiner* — Steven Hieu D Nguyen
(74) *Attorney, Agent, or Firm* — Nokia Technologies Oy (57) ABSTRACT

This document discloses a solution for addressing network slices in a radio interface between a station and an access node. According to an aspect, the station is granted access to a network slice and, when transmitting a data frame of the network slice, the network slice is identified in the data frame by a medium access control address of the data frame.

20 Claims, 6 Drawing Sheets

(56) References Cited

OTHER PUBLICATIONS

"3rd Generation Partnership Project; Technical Specification Group Core Network and Terminals; Wireless LAN control plane protocol for trusted WLAN access to EPC; Stage 3 (Release 15)", 3GPP TS 24.244 V15.2.0, Mar. 2018, pp. 1-69.

"3rd Generation Partnership Project; Technical Specification Group Services and System Aspects; Architecture enhancements for non-3GPP accesses (Release 15)", 3GPP TS 23.402 V15.3.0, Mar. 2018, pp. 1-314.

International Search Report and Written Opinion received for corresponding Patent Cooperation Treaty Application No. PCT/FI2018/050779, dated Jan. 4, 2019, 14 pages.

"Consideration on the Impact of NW Slicing on RAN", 3GPP TSG-RAN WG2 Meeting #97, R2-1701387, Agenda: 10.4, ZTE, Feb. 13-17, 2017, 6 pages.

"Consideration on the Support of URLLC in NR", 3GPP TSG-RAN WG2 Meeting #96, R2-168473, Agenda: 9.2.1.2, ZTE, Nov. 14-18, 2016, 6 pages.

"3rd Generation Partnership Project; Technical Specification Group Services and System Aspects; System Architecture for the 5G System; Stage 2 (Release 15)", 3GPP TS 23.501 V15.2.0, Jun. 2018, pp. 1-217.

Office action received for corresponding Indonesian Patent Application No. P00202103405, dated Jul. 20, 2023, 4 pages of office action and 3 pages of translation available.

\* cited by examiner

NETWORK SLICING IN RADIO INTERFACE

RELATED APPLICATION

This application was originally filed as PCT Application No. PCT/FI2018/050779 on Oct. 26, 2018 which is incorporated herein by reference in its entirety.

FIELD

Various embodiments described herein relate to the field of wireless networking and, particularly, to network slicing implemented at a radio interface.

BACKGROUND

Network slicing is a concept where network resources of an end-to-end connection between a user device and another end point in a public land mobile network (PLMN) are sliced. Similar network slicing may be employed in private networks. A network slice may be understood as a logical end-to-end network that can be dynamically created and/or modified. The network(s) between the end devices may all be sliced from one end device to the other end device, the slices thus forming logical pipelines within the network(s). User equipment (UE) may access a slice over a radio interface. Each pipeline/slice may serve a particular service type such as enhanced mobile broadband (eMBB), ultra-reliable low latency communications (URLLC), or massive Internet of Things (MIoT), for example. MIoT is in some literature called Massive Machine Type Communications (MMTC). Other slices and corresponding service types may be envisaged. Each service type may have distinct characteristics regarding a quality of service (QoS). For example, eMBB may support mechanisms for high bandwidth with moderate delays, URLLC may support mechanisms for low latencies and high reliability of data transfer, and MIoT may support low power consumption at the UE.

BRIEF DESCRIPTION

Some aspects of the invention are defined by the independent claims.

Some embodiments of the invention are defined in the dependent claims.

According to an aspect, there is provided an apparatus comprising means for performing: receiving, from an access node, a scanning message advertising support for network slicing, wherein a network accessed through the access node is divided into logical network slices, and wherein each network slice is associated with a slice identifier; transmitting an association request to the access node, wherein the association request comprises a request for a network slice, and wherein a transmitter address in the association request is a first medium access control, MAC, address of the apparatus and a receiver address in the association request is a first MAC address of the access node; receiving an association response from the access node as a response to the association request, wherein the association response indicates establishment of an association between the apparatus and the access node and comprises an information element indicating granted access to the requested network slice; transmitting, during the association, a first data frame to the access node, wherein the first data frame is addressed to the granted network slice by a MAC address of the first data frame, the MAC address of the first data frame being different from the first MAC address of the apparatus and the first MAC address of the access node; and transmitting, during the association, a second data frame to the access node, wherein the second data frame is not addressed to the granted network slice and comprises the first MAC address of the apparatus and the first MAC address of the access node.

In an embodiment, the MAC address of the first data frame addressing the first data frame to the granted network slice is a second MAC address of the apparatus comprised as a transmitter MAC address of the first data frame, the second MAC address of the apparatus being different from the first MAC address of the apparatus.

In an embodiment, the MAC address of the first data frame addressing the first data frame to the granted network slice is a second MAC address of the access node comprised as a receiver MAC address of the first data frame, the second MAC address of the access node being different from the first MAC address of the access node.

In an embodiment, the means are configured to transmit the first data frame by using a first set of access parameters and to transmit the second data frame by using a second set of access parameters different from the first set of access parameters.

In an embodiment, the first set of access parameters and the second set of access parameters comprise enhanced distributed channel access, EDCA, parameters of IEEE 802.11 technology, and wherein the EDCA parameters of the first set of access parameters are different from the EDCA parameters of the second set of access parameters.

In an embodiment, the MAC address of the first data frame is derived from the slice identifier.

In an embodiment, the MAC address of the first data frame is derived from a combination of an index of the slice identifier and the first MAC address.

In an embodiment, the means are further configured to perform channel contention for said transmitting the first data frame simultaneously with channel contention for said transmitting the second data frame.

In an embodiment, the means are further configured to: request and acquire a grant for a plurality of network slices during the association; and perform a deassociation procedure for one of the plurality of network slices while maintaining an association to another one of the plurality of network slices, wherein the deassociation terminates data transfer for said one of the plurality of network slices.

In an embodiment, the scanning message is a beacon message, a probe response message, the association response, or a response to a query message transmitted by the apparatus.

In an embodiment, the slice identifier is Network Slice Selection Assistance Information, NSSAI, specified in 3GPP specifications.

According to another aspect, there is provided an apparatus comprising means for performing: transmitting a scanning message advertising support for network slicing, wherein a network provided by the apparatus is divided into logical network slices, and wherein each slice is associated with a slice identifier; receiving an association request from a station, wherein the association request comprises a request for a network slice, and wherein a transmitter address in the association request is a first medium access control, MAC, address of the station and a receiver address in the association request is a first MAC address of the apparatus; transmitting an association response to the station as a response to the association request, wherein the association response indicates establishment of an association between the apparatus and the station and comprises an information element indicating granted access to the requested network slice; receiving, during the association, a first data frame from the station, wherein the first data frame is addressed to the granted network slice by a MAC address of the first data frame, the MAC address of the first data frame being different from the first MAC address of the apparatus and the first MAC address of the station; forwarding, on the basis of association between the MAC address and the granted network slice, payload of the first data frame to the granted network slice; and receiving, during the association, a second data frame from the station, wherein the second data frame is not addressed to the granted network slice and comprises the first MAC address of the apparatus and the first MAC address of the station.

In an embodiment, the means are further configured to transmit access parameters for each supported network slice, wherein one of the network slices have access parameters that are different from access parameters of another one of the network slices.

In an embodiment, the MAC address of the first data frame is a second MAC address of the station, and wherein the means are further configured to determine the second MAC address of the station and to transmit the second MAC address of the station to the station in the association response or in another message.

In an embodiment, the means are further configured to determine the MAC address from the first MAC address of the station or the first MAC address of the apparatus.

In an embodiment, the MAC address of the first data frame is a second MAC address of the station, and wherein the means are further configured to receive from the station an assignment of the second MAC address of the station to the requested network slice.

In an embodiment of any one of the above-described apparatuses, the means comprises: at least one processor; and at least one memory including computer program code, the at least one memory and computer program code configured to, with the at least one processor, cause the performance of the apparatus.

According to another aspect, there is provided a method comprising: receiving, by an apparatus from an access node, a scanning message advertising support for network slicing, wherein a network accessed through the access node is divided into logical network slices, and wherein each network slice is associated with a slice identifier; transmitting, by the apparatus, an association request to the access node, wherein the association request comprises a request for a network slice, and wherein a transmitter address in the association request is a first medium access control, MAC, address of the apparatus and a receiver address in the association request is a first MAC address of the access node; receiving, by the apparatus, an association response from the access node as a response to the association request, wherein the association response indicates establishment of an association between the apparatus and the access node and comprises an information element indicating granted access to the requested network slice; transmitting, by the apparatus during the association, a first data frame to the access node, wherein the first data frame is addressed to the granted network slice by a MAC address of the first data frame, the MAC address of the first data frame being different from the first MAC address of the apparatus and the first MAC address of the access node; and transmitting, by the apparatus during the association, a second data frame to the access node, wherein the second data frame is not addressed to the granted network slice and comprises the first MAC address of the apparatus and the first MAC address of the access node.

In an embodiment, the MAC address of the first data frame addressing the first data frame to the granted network slice is a second MAC address of the apparatus comprised as a transmitter MAC address of the first data frame, the second MAC address of the apparatus being different from the first MAC address of the apparatus.

In an embodiment, the MAC address of the first data frame addressing the first data frame to the granted network slice is a second MAC address of the access node comprised as a receiver MAC address of the first data frame, the second MAC address of the access node being different from the first MAC address of the access node.

In an embodiment, the first data frame is transmitted by using a first set of access parameters and the second data frame is transmitted by using a second set of access parameters different from the first set of access parameters.

In an embodiment, the first set of access parameters and the second set of access parameters comprise enhanced distributed channel access, EDCA, parameters of IEEE 802.11 technology, and wherein the EDCA parameters of the first set of access parameters are different from the EDCA parameters of the second set of access parameters.

In an embodiment, the MAC address of the first data frame is derived from the slice identifier.

In an embodiment, the MAC address of the first data frame is derived from a combination of an index of the slice identifier and the first MAC address.

In an embodiment, the method further comprises performing channel contention for said transmitting the first data frame simultaneously with channel contention for said transmitting the second data frame.

In an embodiment, the method comprises: requesting and acquiring a grant for a plurality of network slices during the association; and performing a deassociation procedure for one of the plurality of network slices while maintaining an association to another one of the plurality of network slices, wherein the deassociation terminates data transfer for said one of the plurality of network slices.

In an embodiment, the scanning message is a beacon message, a probe response message, the association response, or a response to a query message transmitted by the apparatus.

In an embodiment, the slice identifier is Network Slice Selection Assistance Information, NSSAI, specified in 3GPP specifications.

According to another aspect, there is provided a method comprising: transmitting, by an apparatus, a scanning message advertising support for network slicing, wherein a network provided by the apparatus is divided into logical network slices, and wherein each slice is associated with a slice identifier; receiving, by the apparatus, an association request from a station, wherein the association request comprises a request for a network slice, and wherein a transmitter address in the association request is a first medium access control, MAC, address of the station and a receiver address in the association request is a first MAC address of the apparatus; transmitting, by the apparatus, an association response to the station as a response to the association request, wherein the association response indicates establishment of an association between the apparatus and the station and comprises an information element indicating granted access to the requested network slice; receiving, by the apparatus during the association, a first data frame from the station, wherein the first data frame is addressed to the granted network slice by a MAC address of the first data frame, the MAC address of the first data frame being different from the first MAC address of the apparatus and the first MAC address of the station; forwarding, by the apparatus on the basis of association between the MAC address and the granted network slice, payload of the first data frame to the granted network slice; and receiving, by the apparatus during the association, a second data frame from the station, wherein the second data frame is not addressed to the granted network slice and comprises the first MAC address of the apparatus and the first MAC address of the station.

In an embodiment, the method further comprises transmitting, by the apparatus, access parameters for each supported network slice, wherein one of the network slices have access parameters that are different from access parameters of another one of the network slices.

In an embodiment, the MAC address of the first data frame is a second MAC address of the station, and the method further comprises determining, by the apparatus, the second MAC address of the station and transmitting the second MAC address of the station to the station in the association response or in another message.

In an embodiment, the method further comprises determining the MAC address from the first MAC address of the station or the first MAC address of the apparatus.

In an embodiment, the MAC address of the first data frame is a second MAC address of the station, and the method further comprises receiving, by the apparatus, from the station an assignment of the second MAC address of the station to the requested network slice.

According to another aspect, there is provided a computer program product embodied on a distribution medium readable by a computer and comprising program instructions which, when loaded into an apparatus, cause the computer to execute a computer process comprising: receiving, from an access node, a scanning message advertising support for network slicing, wherein a network accessed through the access node is divided into logical network slices, and wherein each network slice is associated with a slice identifier; transmitting an association request to the access node, wherein the association request comprises a request for a network slice, and wherein a transmitter address in the association request is a first medium access control, MAC, address of the apparatus and a receiver address in the association request is a first MAC address of the access node; receiving an association response from the access node as a response to the association request, wherein the association response indicates establishment of an association between the apparatus and the access node and comprises an information element indicating granted access to the requested network slice; transmitting, during the association, a first data frame to the access node, wherein the first data frame is addressed to the granted network slice by a MAC address of the first data frame, the MAC address of the first data frame being different from the first MAC address of the apparatus and the first MAC address of the access node; and transmitting, during the association, a second data frame to the access node, wherein the second data frame is not addressed to the granted network slice and comprises the first MAC address of the apparatus and the first MAC address of the access node.

According to another aspect, there is provided a computer program product embodied on a distribution medium readable by a computer and comprising program instructions which, when loaded into an apparatus, cause the computer to execute a computer process comprising: transmitting a scanning message advertising support for network slicing, wherein a network provided by the apparatus is divided into logical network slices, and wherein each slice is associated with a slice identifier; receiving an association request from a station, wherein the association request comprises a request for a network slice, and wherein a transmitter address in the association request is a first medium access control, MAC, address of the station and a receiver address in the association request is a first MAC address of the apparatus; transmitting an association response to the station as a response to the association request, wherein the association response indicates establishment of an association between the apparatus and the station and comprises an information element indicating granted access to the requested network slice; receiving, during the association, a first data frame from the station, wherein the first data frame is addressed to the granted network slice by a MAC address of the first data frame, the MAC address of the first data frame being different from the first MAC address of the apparatus and the first MAC address of the station; forwarding, on the basis of association between the MAC address and the granted network slice, payload of the first data frame to the granted network slice; and receiving, during the association, a second data frame from the station, wherein the second data frame is not addressed to the granted network slice and comprises the first MAC address of the apparatus and the first MAC address of the station.

LIST OF DRAWINGS

Embodiments are described below, by way of example only, with reference to the accompanying drawings, in which.

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
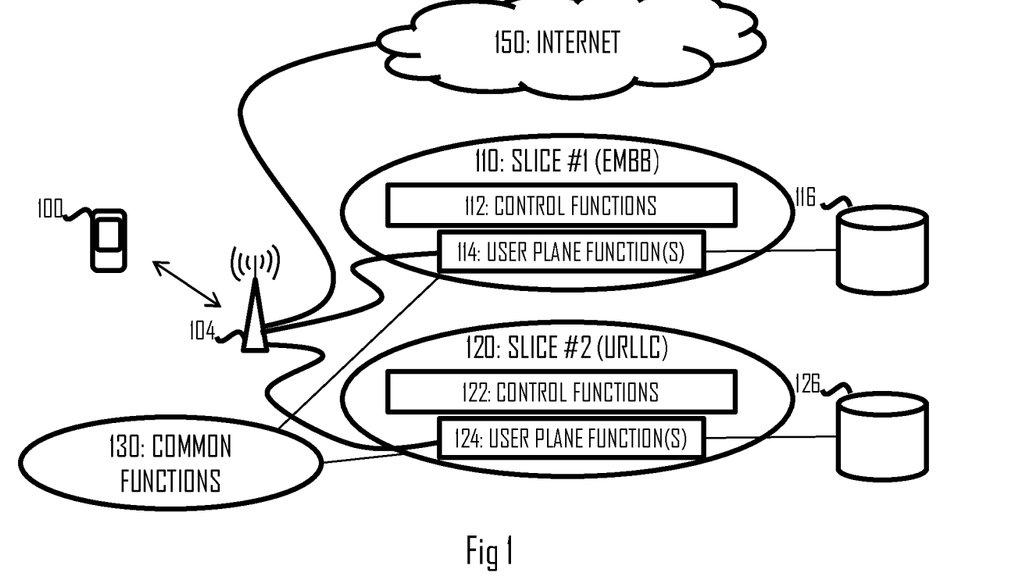
FIG. 1 illustrates a wireless communication scenario to which some embodiments of the invention may be applied.

A wireless communication scenario to which some embodiments of the invention may be applied is illustrated in FIG. 1. FIG. 1 illustrates a wireless device 100 that may operate as a station in an IEEE 802.11 based wireless network or networks. In some contexts, the wireless device may be called user equipment, user device, or a peer device. FIG. 1 further illustrates an access node 104. The access node may manage a wireless network and provide the wireless device 100 with wireless access to other networks such as the Internet. In some implementations, a cellular communication system may use the access node as an extension to its service area, in which case the access node 104 may provide the wireless device 100 with access to a core network of the cellular communication system, for example. The wireless device employ a physical layer and a medium access control (MAC) layer that comply with wireless local area network (WLAN) specifications based on IEEE 802.11. In the WLAN specifications, a wireless network provided by the access node 104 is called a basic service set (BSS), the access node may be called an access point, and an apparatus served by the access point is called a station (STA). In peer networks, a wireless network operating according to the WLAN specifications may be established amongst the stations. While some embodiments of the invention are described in the context of the IEEE 802.11, it should be appreciated that these or other embodiments of the invention may be applicable to wireless networks based on other specifications, e.g. WiMAX (Worldwide Interoperability for Microwave Access), UMTS LTE (Long-term Evolution for Universal Mobile Telecommunication System), 5G cellular communication systems, including unlicensed radio variants, Multefire, mobile ad hoc networks (MANET), mesh networks, and other networks having cognitive radio features, e.g. transmission medium sensing features and adaptive capability to coexist with radio access networks based on different specifications and/or standards. Some embodiments may be applicable to networks having features under development by other IEEE task groups. Therefore, the following description may be generalized to other systems as well.

A station may establish a connection with any one of access nodes it has detected to provide a wireless connection at the location of the apparatus 100. The connection establishment may include authentication where an identity of the station is established in the access node. The authentication may comprise setting up an encryption key used in the BSS. After the authentication, the access node and the station may carry out association in which the station entity is fully registered in the BSS, e.g. by providing the station entity with an association identifier (AID). It should be noted that in other systems terms authentication and association are not necessarily used and, therefore, the association of the station entity to an access node may be understood broadly as establishing a connection between the station entity and the access node such that the station entity is in a connected state with respect to the access node and waiting for downlink frame transmissions from the access node and monitoring its own buffers for uplink frame transmissions. A station entity not associated to the access node is in an unassociated state. An unassociated station entity may still exchange some frames with the access node.

Network slicing described briefly in Background allows a network operator to provide dedicated virtual networks over a common network infrastructure. The different virtual or logical networks may be designed to provide different networking characteristics such as different qualities of service (QoS). For example, the virtual networks may be customized to meet specific needs of various applications, services, devices, customers and/or operators. Network slicing thus enables support for numerous and varied services envisaged in 5G, for example.

In a system employing the network slicing, a single physical network or a group of networks is sliced into multiple virtual networks (slices) that can support different radio access networks (RANs) or different service types running across a single RAN. The network slicing may be used to partition a core network of a cellular communication system such as a 5G system, but it may also be implemented in the RAN such as the WLAN.

Each network slice may be optimized to provide resources and network topology for the specific service and traffic that will use the slice. Network resources may be allocated according to requirements in terms of mobility, capacity, connectivity and coverage such that particular demands of each use case will be met. Physical network components or resources may be shared across different network slices.

Each network slice may be isolated from other network slices so that no network slice interferes with the traffic in another network slice. Each network slice may be configured with its own network architecture, engineering mechanism and network provisioning. The network slice typically contains management capabilities, which may be controlled by the network operator or the customer, depending on the use case. The network slice may be independently managed and orchestrated. The user experience of the network slice will be the same as if it was a physically separate network.

For example, an autonomous car will rely on V2X (vehicle-to-anything) communication which requires low latency but not necessarily a high throughput. The URLLC network slice described in Background may provide a suitable networking service. A streaming service consumed while the car is in motion will require a high throughput and is susceptible to latency. The eMBB network slice described in Background may provide a suitable networking service for such an application. Both networking services can be delivered over the same common physical network(s) on different virtual network slices.

Each virtual network (network slice) comprises a unique identifier. 3GPP specifications define Network Slice Selection Assistance Information (NSSAI) for such a purpose. A wireless device may readily have NSSAI values and application mappings that link applications to the network slices. The NSSAI values may be provided by a cellular communication system, or the NSSAI values may exist in a subscriber identification module (SIM) or equivalent identity card of the wireless device 100. Slice identification may also take other form than 3GPP NSSAI.

FIG. 1 illustrates an embodiment of the network slicing. The access node 104 may provide access to one or more sliced networks illustrated by the network slices 110, 120. The network slice 110 may be established to an end device 116 that may be a network element of a PLMN or a private network. The end device may be a network element of a core network of a cellular communication system such as a 5G system, or a network residing on top of the core network. In a similar manner, the network slice 120 may be established to an end device 126 that may be a network element of the PLMN or a private network. The end devices 116, 126 may be different network elements, and they may belong to the same network or different networks. The slices may employ at least partially the same physical network components and have unique slice identifiers, e.g. unique NSSAIs. Each network slice 110, 120 may comprise control functions 112, 122 that control the functions of the network slices. Examples of the control functions may include a session management function (SMF), a policy control function (PCF), and a network function repository function (NRF). SMF manages data sessions, PCF manages roaming and mobility, and NRF maintains a network function profile of the network slice and supports the discovery of the network slice. Each network slice may also comprise user plane function(s) 114, 124 that handle data transfer through the respective network slice. Additionally, there may be network functions 130 that are common to multiple network slices 110, 120. Such common functions 130 may include, for example, a network slice detection function (NSSF) and/or an access and mobility management function (AMF). Network slice instance selection for the station may be triggered as a part of a registration procedure by the AMF that receives the registration request from the station. The AMF retrieves the slices that are allowed by user subscription and interacts with the NSSF to select the appropriate Network Slice instance.

Figure 2:
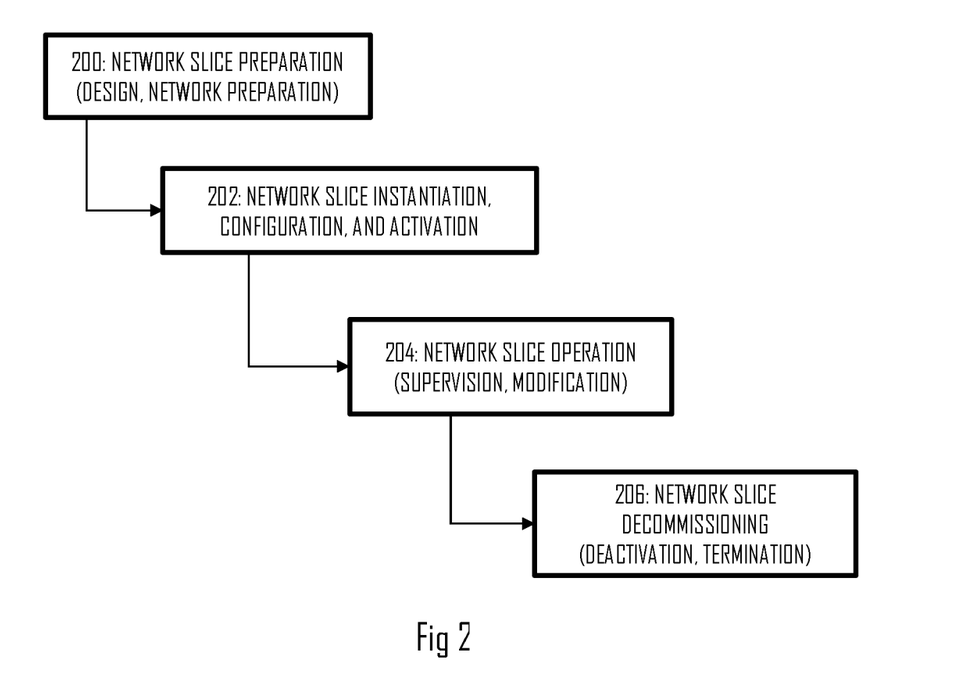
FIG. 2 illustrates a life cycle of a network slice.

3GPP specifications describe network slice instance lifecycle management as depicted in FIG. 2. A network slice is first designed in a preparation phase 200. Then, it is instantiated in step 200, comprising an instantiation phase, a configuration phase, and an activation phase. Then, the network slice is operational in step 204 where the network slice may be monitored and, if deemed necessary, modified. Finally, the network slice may be decommissioned (step 206) when the network slice is no longer needed.

Figure 3:
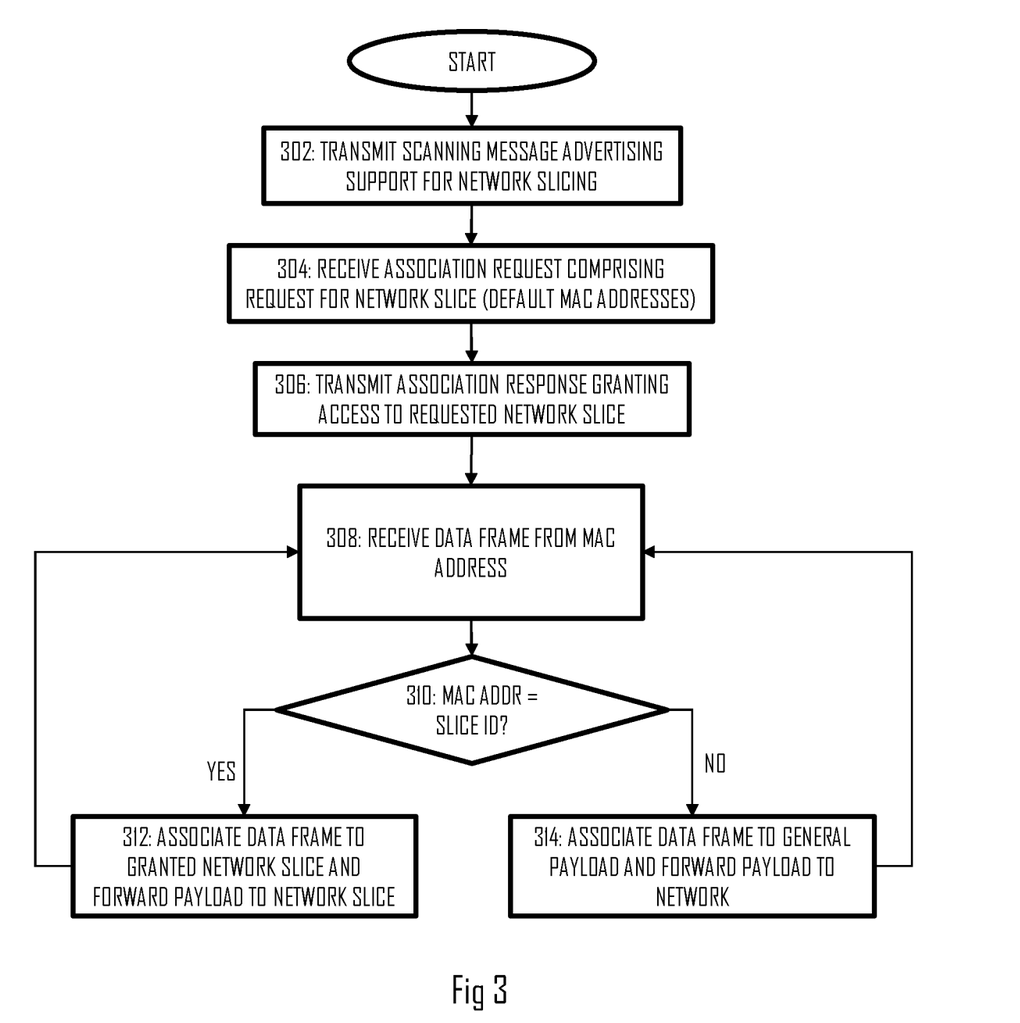
FIGS. 3 and 4 illustrate flow diagrams of processes for addressing network slices according to some embodiments of the invention.
Figure 4:
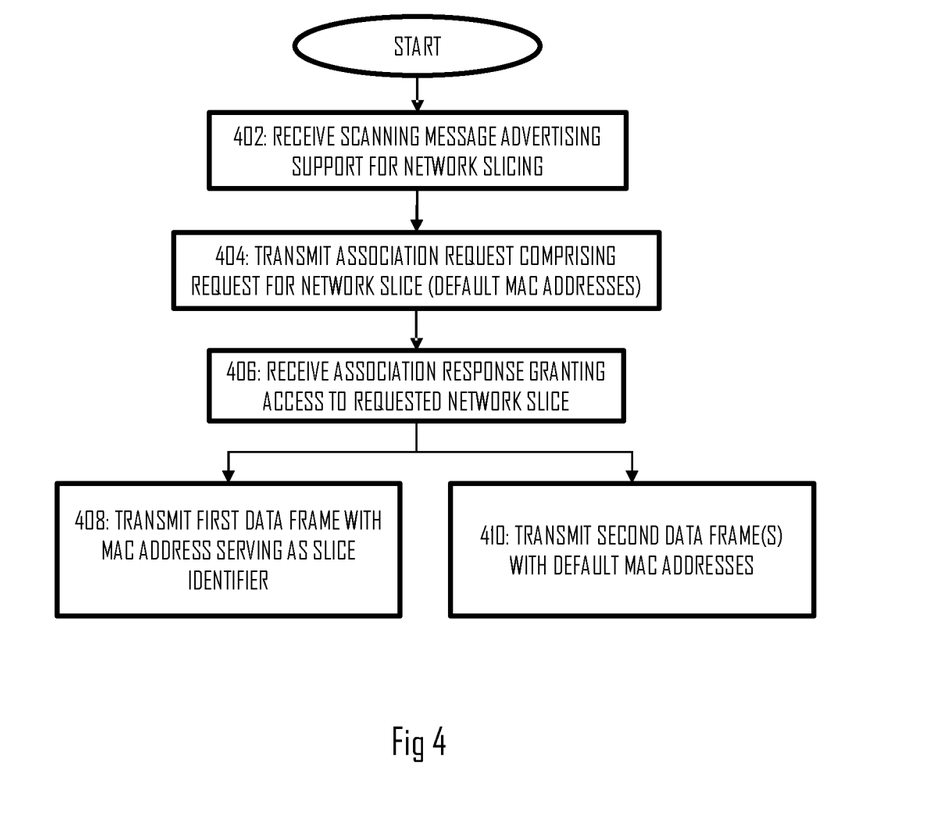

Let us consider a network topology of FIG. 1 in a situation where the station 100 and the access node 104 supports 802.11 technology or another radio access technology where the station 100 is capable of associating to only one access node at a time. The network slicing may extend to the radio interface between the station 100 and the access node 104. An apparatus comprising the station 100 may operate different application that require transfer of different types of data. One type of data may belong to a service of one of the network slices 110, 120 while another type of data may be conventional user data not mapped to any network slice. FIGS. 3 and 4 illustrate some embodiments of the invention for mapping the different types of data to one or more network slices within one and the same association between the station 100 and the access node 104.

Referring to FIG. 3, let us describe a process executed in an apparatus for the access node 104. The process comprises: transmitting (block 302) a scanning message advertising support for network slicing, wherein a network provided by the apparatus is divided into logical network slices, and wherein each slice is associated with a slice identifier; receiving (block 304) an association request from a station, wherein the association request comprises a request for a network slice, and wherein a transmitter address in the association request is a first medium access control (MAC) address of the station and a receiver address in the association request is a first MAC address of the apparatus; transmitting (block 306) an association response to the station as a response to the association request, wherein the association response indicates establishment of an association between the apparatus and the station and comprises an information element indicating granted access to the requested network slice; receiving (block 308), during the association, a first data frame from the station, wherein the first data frame is addressed to the granted network slice by a MAC address of the first data frame, the MAC address of the first data frame being different from the first MAC address of the apparatus and the first MAC address of the station; forwarding (block 312), on the basis of association between the MAC address and the granted network slice (block 310), payload of the first data frame to the granted network slice; and receiving (block 308), during the association, a second data frame from the station, wherein the second data frame is not addressed to the granted network slice and comprises the first MAC address of the apparatus and the first MAC address of the station. Block 310 may comprise checking the transmitter address of the received data frame. If the transmitter address is a second MAC address of the station different from the first MAC address of the station, the data frame may be determined to belong to the granted network slice and, as a consequence, contents of the data frame may be forwarded to the network slice in block 312. If the transmitter address is the first MAC address of the station, e.g. the MAC address of the station used in the establishment of the association in blocks 304 and 306, the data frame may be determined to be general user data and, as a consequence, contents of the data frame may be forwarded to a network that does not belong to any negotiated network slice, e.g. a network resource not having a slice identifier (block 314).

In another embodiment, block 310 may comprise checking the receiver address of the received data frame. If the receiver address is a second MAC address of the apparatus (or the access node) different from the first MAC address of the apparatus, the data frame may be determined to belong to the granted network slice and, as a consequence, contents of the data frame may be forwarded to the network slice in block 312. If the receiver address is the first MAC address of the apparatus, e.g. the MAC address of the apparatus used in the establishment of the association in blocks 304 and 306, the data frame may be determined to be general user data and, as a consequence, contents of the data frame may be forwarded to a network that does not belong to any negotiated network slice, e.g. a network resource not having a slice identifier (block 314).

Referring to FIG. 4, let us describe a process executed in an apparatus such as the station/apparatus 100. The process comprises: receiving (block 402), from an access node, a scanning message advertising support for network slicing, wherein a network accessed through the access node is divided into logical network slices, and wherein each network slice is associated with a slice identifier; transmitting (block 404) an association request to the access node, wherein the association request comprises a request for a network slice, and wherein a transmitter address in the association request is a first medium access control, MAC, address of the apparatus and a receiver address in the association request is a first MAC address of the access node; receiving (block 406) an association response from the access node as a response to the association request, wherein the association response indicates establishment of an association between the apparatus and the access node and comprises an information element indicating granted access to the requested network slice; transmitting (block 408), during the association, a first data frame to the access node, wherein the first data frame is addressed to the granted network slice by a MAC address of the first data frame, the MAC address of the first data frame being different from the first MAC address of the apparatus and the first MAC address of the access node; and transmitting (block 410), during the association, a second data frame to the access node, wherein the second data frame is not addressed to the granted network slice and comprises the first MAC address of the apparatus and the first MAC address of the access node.

Embodiments of FIGS. 3 and 4 enable mapping of the data to the appropriate network slice by using the MAC address as the slice identifier in the radio interface between the station 100 and the access node 104. As described above, the MAC address used as the slice identifier may be a MAC address of the station 100 or the access node or, from another perspective, a transmitter MAC address or a receiver MAC address of the data frame. Default MAC address(es) may be used for default data not addressed to any specific network slice, and special MAC address(es) may be used as slice identifier(s), as described herein. As a consequence, one or more network slices may be accessed within the same association or connection. This is optimal compared to a situation where the network slices are associated with service set identifiers, for example, and the station would have to switch networks to transmit data to different network slices. The station 100 and/or the access node may have one or more MAC addresses that differ from the MAC address used in the establishment of the association in blocks 304, 306, 404, 406, and such one or more MAC addresses may be used to address data to one or more network slices accessible to the station in a wireless network managed by the access node 104. Additionally, default data addressed to none of the network slices may be transferred over the same association by using the MAC address used in the establishment of the association.

With regard to general data processing in a radio modem of the receiver, e.g. the access node, whenever a data frame comprising a MAC address of the station is receiver, the same general data processing may be performed regardless of whether the MAC address is the first MAC address or the second MAC address of the station. As described herein, the multiple MAC addresses may serve as the slice identifiers enabling forwarding of data to appropriate network slices.

The access node may store mappings between the transmitter MAC addresses serving and the slice identifiers in one or more networks accessed by the access node, e.g. the core network of the cellular communication system. The mappings enable seamless forwarding of data of the network slices.

The access node 104 may employ the same principle for downlink data. Downlink data received from the granted network slice may be addressed to the second MAC address of the station in the radio interface, and downlink data not associated with any network slice may be addressed to the first MAC address of the station in the radio interface. In practice, the MAC addresses of the station are used as slice identifiers in the radio interface.

In addition, or as an alternative, to the MAC address of the station, a MAC address of the access node may be used to address the network slice to which the data frame belongs. Referring to blocks 308 and 408, a receiver address of the first data frame may be a first MAC address of the access node. Similarly for blocks 310 and 410, a receiver address of the second data frame may be a second MAC address of the access node different from the first MAC address of the access node. Accordingly, in one embodiment the MAC address of the station is the same in blocks 308, 310, 408, 410 while, in another embodiment, the MAC addresses of both the station and the access node are used to address the desired network slice (blocks 308, 312, 408) or to address the default data network (blocks 310, 314, 410).

In yet another embodiment, the apparatus 100 may have multiple internet protocol (IP) addresses, wherein the each of the multiple IP addresses is associated to a dedicated network slice. Accordingly, the IP address(es) may also be used as slice identifier on a protocol layer. The operation when using the IP address as the slice identifier may follow the embodiments described herein for the MAC address as the slice identifier.

In an embodiment, the association comprises multiple distinct MAC address pairs, each MAC address pair comprising a MAC address of the station and a MAC address of the access node, one MAC address pair being associated with the default data connection and default data network, i.e. no network slice, while each remaining one or more MAC address pairs is associated with a specific network slice. Accordingly, the MAC address pair may be used to indicate the network slice of the data frame, or to indicate no specific network slice for the data frame.

In an embodiment, the network slice addressing in data payload is carried out by introducing a new Ethernet slice header denoted by '3GPP slice', for example. The slice header may include a 2-octet long Ethertype field denoted by '3GPP slice', and the Ethertype field may be followed by the network slice identifier, e.g. a NSSAI value. The Ethernet slice header would precede an original Ethertype in an Ethernet header, e.g. a virtual local area network (VLAN) tag used in virtual networking. A transmitter of a frame may add, in front of the original Ethertype, the Ethernet slice header indicating the network slice to which the frame belongs, and the receiver of the frame may detect the network slice of the frame from the Ethertype '3GPP slice', read the slice identifier and, thereafter, delete the respective Ethernet slice header before passing the frame to a higher layer in the respective slice, or before processing the next (original) Ethertype.

In an embodiment, the station transmits the first data frame by using a first set of access parameters and the second data frame by using a second set of access parameters. The different access parameters may allow prioritization amongst the network slices. It may useful in systems where the station performs channel contention in order to transmit uplink data. The different access parameters may allow meeting varying quality-of-service requirements of the different network slices.

In another embodiment, the same access parameters may be applied to multiple or even all network slices. In such embodiments, the access node may manage the quality-of-service requirements by scheduling uplink transmissions of the different network slices. The access node may employ different scheduling policies for the different network slices and use the different MAC addresses of the station when signalling the uplink scheduling to the station. For example, the access node may schedule more frequent uplink transmissions to a network slice that has a higher priority. The access node may use a polling message of 802.11 specifications as a message that indicates the scheduling assignments to the different MAC addresses of the station and allows for contention-free uplink transmission. The access node may scheduling an uplink transmission to a network slice of the station and transmit the polling message as addressed to a MAC address of the network slice. The polling message may also define a transmission configuration comprising a transmission duration and/or bandwidth, for example. When scheduling an uplink transmission to another network slice of the station, the access node may transmit another polling message as addressed to the MAC address of the other network slice. When scheduling an uplink transmission to the default data, the access node may transmit another polling message as addressed to the default MAC address of the station. These scheduling of the different network slices may be performed during the same association.

Figure 5:
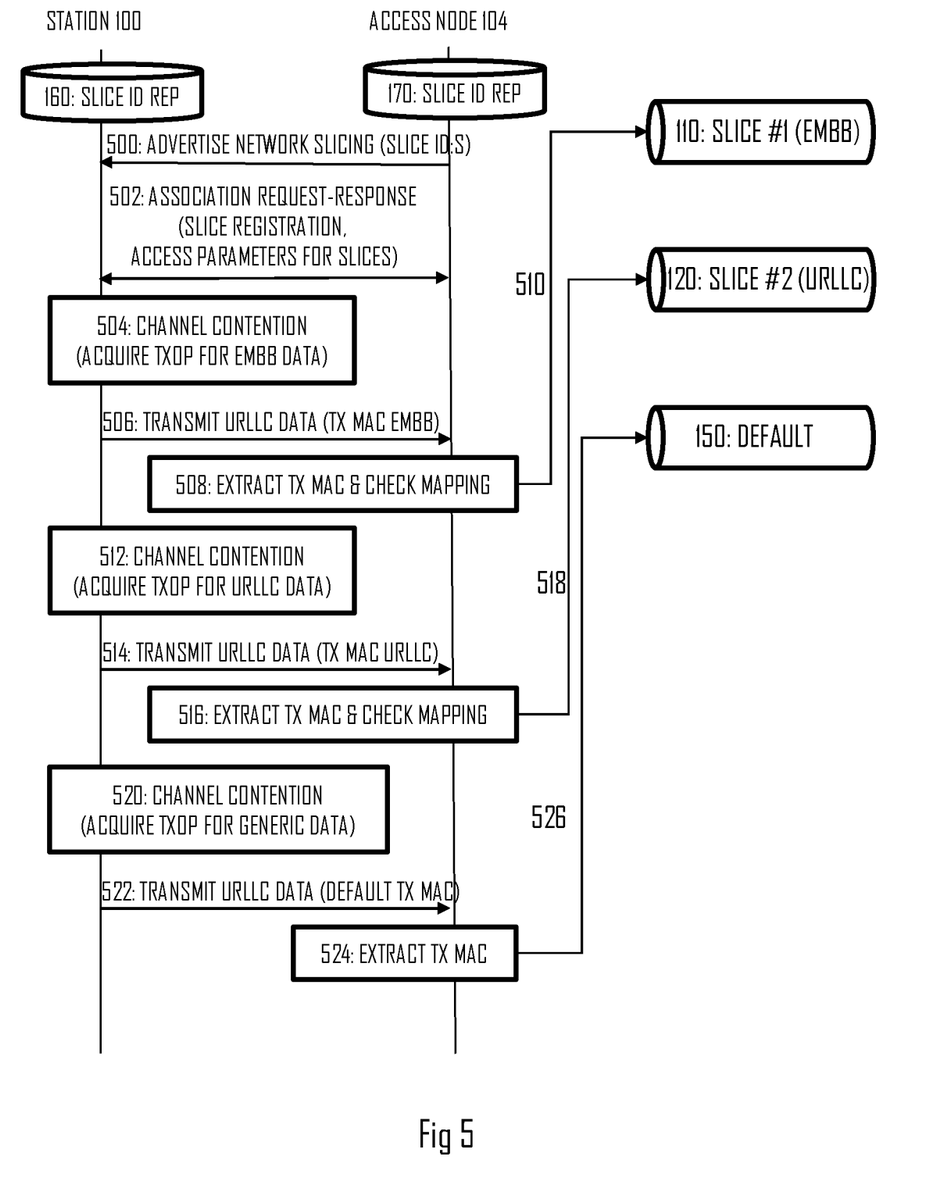
FIG. 5 illustrates a signalling diagram of an embodiment for data forwarding.

Let us now describe some embodiments of the procedures of FIGS. 3 and 4 in greater detail with reference to FIG. 5. FIG. 5 illustrates a signalling diagram illustrating communication between the apparatus/station 100 and the access node 104 and mapping of data to the network slices. The network slices in FIG. 5 illustrate the network slices 110, 120 described above in connection with FIG. 1. Additionally, there is illustrated a "pipeline" for default data, e.g. conventional user data not mapped to any dedicated network slice. The default data may be associated with no slice identifier.

Referring to FIG. 5, the station 100 may store slice identifiers in a slice identifier repository 160 comprised in a memory of the station 100. The slice identifiers may comprise the NSSAIs, for example, that may be stored in a universal subscriber identity module (USIM) of the apparatus 100. In another embodiment, the station 100 has received the slice identifiers during a previous connection with a cellular communication system, for example. Some applications executed in the apparatus 100 may employ fixed and preconfigured slice identifiers and, as a consequence, the slice identifiers may be stored in the apparatus in a permanent manner. In other embodiments, some application(s) may receive the slice identifier(s) as a dynamic, static, or semi-static allocation from a network such as the 5G cellular network. In the embodiment of FIG. 5, a starting assumption is that the station has the slice identifiers. The access node 104 providing access to the network slices may store or have access to a corresponding slice identifier repository 170.

In step 500, the access node 500 transmits the scanning message advertising the support for the network slicing. The scanning message may comprise slice identifier(s) of the supported network slice(s). In the simplest form, the support for the network slicing may be indicated by a one-bit flag in the scanning message. Information on the supported network slices and slice identifiers may be shared in a separate procedure, e.g. a service discovery procedure or the association procedure described above. The scanning message may be a beacon message broadcasted by the access node 104, a probe response message responding to a probe request from the station 100, a generic advertisement service (GAS) response of 802.11 technology responding to a GAS request from the station 100, or an access network query protocol (ANQP) response responding to an ANQP request from the station 100.

Step 502 is an embodiment of the above-described blocks 304, 306, 404, and 406. As described above, the station may indicate in the association request one or more network slices the station requests to use. The network slice(s) may be indicated by using the respective slice identifier(s). In the association response, the access node may grant or refuse access to the requested network slice(s). If the access is granted, the station may be subscribed or registered to the requested network slices during the association procedure. The station may still complete a full authentication procedure before being able to use the network slices.

In connection with associating the station with a network slice, the mapping between the MAC address of the radio interface and the network slice may be established. As described above, the specific MAC address of the station and/or the access node may serve as the slice identifier in the radio interface, and the specific MAC address may differ from the default MAC address of the station and/or the access node.

In an embodiment, the specific MAC address is derived from the slice identifier. In an embodiment, the specific MAC address is derived from a combination of the slice identifier and the default MAC address. For example, the specific MAC address serving as the slice identifier of the network slice may be computed as:

MAC(slice)=MAC(default)+1+slice identifier index

The slice identifier index may in this example have a range {0, maxSlice) where maxSlice is the maximum number of network slices. Since the default MAC address of the station/access node is available to both the station and the access node from the association phase of step 502, both the station and the access node may compute the MAC address specific to the network slice by using the default MAC address and the index of the slice identifier. In another embodiment, the specific MAC address may be computed from the default MAC address and the slice identifier according to another logic. Various alternative solutions can be envisaged, e.g. converting the slice identifier into a pseudo value and combining the pseudo value with the default MAC address to create new unique addresses within the wireless network. The MAC addresses may be controlled to be unique within at least the wireless network.

In another embodiment, the access node selects the specific MAC address for the station and assigns the MAC address for the granted network slice in the association response, for example.

In yet another embodiment, the station 100 determines the MAC addresses of the network slices and indicates the MAC addresses and the mappings between the MAC addresses and respective network slices to the access node, e.g. in the association request or in a separate management message after the association has been established in step 502. For example, the apparatus 100 may retrieve the slice-specific MAC addresses from a core network element of the cellular communication system, and the apparatus 100 may access the core network element through the association established in step 502. In such an embodiment, the association in step 502 may be a conventional association where the station does not yet request for any network slice. Upon establishing the association, the apparatus may establish a non-access stratum registration with the core network element and receive the slice-specific MAC addresses from the core network element. Upon receiving the slice-specific MAC addresses, an association procedure or a reassociation procedure may be performed to register the station 100 to the specific one or more network slices and to transfer the mapping information between the slice-specific MAC addresses and respective network slices to the access node. In another embodiment, the access to the network slice(s) may be granted in step 502 in the above-described manner and the MAC-address-to-network-slice mappings may be established before transmitting any frames over the network slice(s).

As described above, the station may employ different access parameters for the different data frames. The differing access parameters may comprise quality-of-service (QoS) parameters such as enhanced distributed channel access (EDCA) parameters of IEEE 802.11 technology. Accordingly, the station may employ concurrently multiple sets of different access parameters, one set for each network slice and, optionally, another set for the default network data not belonging to any network slice. The EDCA parameters may define, for example, an arbitration inter-frame space number (AIFSN) value, minimum and maximum contention window sizes for the station when transmitting data for the respective network slice, a transmission opportunity limit, and/or information on access category type(s) allowed for the network slice. Different access category sets may be allowed for different network slices. For example, for one network slice (e.g. eMBB) all four different access categories of 802.11 may be defined, but for another network slice (e.g. URLLC), only one access category could be defined. The access node may allocate the access parameters for the granted network slice(s) in step 502. The station may employ conventional access parameters for the default data irrespective of the access parameters allocated to the network slice(s).

When the association has been established in step 502 and the access to the network slice(s) granted, the station may start frame transmissions. When the radio interface supports the 802.11 technology or a corresponding radio access technology, the station may perform channel contention before the frame transmission. In block 504, the station performs channel contention for data of an application mapped to one of the network slices (eMBB slice in this example). Upon gaining a transmission opportunity (TXOP) as a result of successful channel contention, the station may generate and transmit a frame where the transmitter address is the MAC address mapped to the eMBB slice (step 506). Upon receiving the frame in step 506, the access node may extract the transmitter MAC address of the frame and check, from a database, a network slice mapped to the transmitter MAC address (block 508). If the mapping indicates that the transmitter address is mapped to the eMBB slice, the access node may forward contents of the frame, e.g. the payload, to network resource(s) of the eMBB slice 110 (step 510).

In block 512, the station performs channel contention for data of an application mapped to another one of the network slices (URLLC slice in this example). Upon gaining a TXOP as a result of successful channel contention, the station may generate and transmit a frame where the transmitter address is the MAC address mapped to the URLLC slice (step 514). Upon receiving the frame in step 514, the access node may extract the transmitter MAC address of the frame and check, from the database, a network slice mapped to the transmitter MAC address (block 516). If the mapping indicates that the transmitter address is mapped to the URLLC slice, the access node may forward contents of the frame, e.g. the payload, to network resource(s) of the URLLC slice 120 (step 518).

In block 520, the station performs channel contention for generic data of an application not mapped to any one of the network slices. Upon gaining a TXOP as a result of successful channel contention, the station may generate and transmit a frame where the transmitter address is the default MAC address of the station (step 522). Upon receiving the frame in step 522, the access node may extract the transmitter MAC address of the frame and detect that the transmitter MAC address is the default MAC address of the station (block 524). As a consequence, the access node may forward contents of the frame, e.g. the payload, to default network resources 150 not belonging to any dedicated network slice.

In this manner, the procedure may continue within the association established in step 502. The default MAC address of the station, used as a transmitter address of the association request frame in step 502, may be used as a transmitter MAC address when transmitting data according to steps 520 and 522. Otherwise, the station may replace the default transmitter MAC address by a MAC address specific to the network slice to which the transmitted data belongs. In other words, different data types may be transmitted to the access node from different transmitter MAC addresses of the station. The different data types may refer to the different applications executed in the apparatus 100 that employ different services provided by the different network slices.

In an embodiment where the radio interface complies with 802.11 technology, the station 100 may enable a local bit parameter of 802.11 specifications in the frames transmitted in blocks 506, 514. The local bit parameter indicates that the MAC address in the frame is locally managed.

Figure 6:
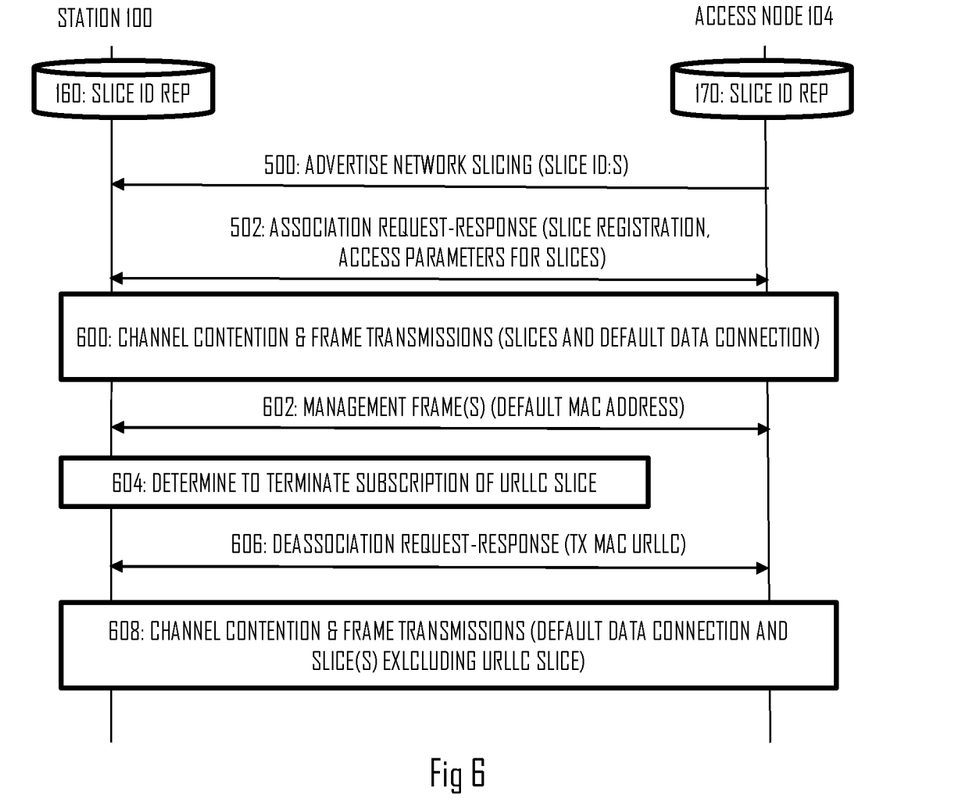
FIG. 6 illustrates a signalling diagram of a procedure for configuring network slices within an association.

In an embodiment, the station performs a deassociation procedure for one of the plurality of network slices while maintaining an association to another one of the plurality of network slices, wherein the deassociation terminates data transfer for said one of the plurality of network slices. In a similar manner, the station may request for association to new network slices after 502 has been completed. In other words, the station and the access node may negotiate about adding or terminating access(es) to network slice(s) during the association per network slice. FIG. 6 illustrates an embodiment of such a procedure.

Referring to FIG. 6, steps 500 and 502 may be performed in the above-described manner, and frame transmissions may be carried out in block 600, as described above with reference to steps 504 to 526. During the association, uplink and/or downlink management frames may be transmitted in step 602, and the transmitter and receiver addresses in the management frames may be the default MAC addresses of the station 100 and the access node 104. This embodiment is applicable to the above-described embodiments as well.

In block 604, the station or the access node determines to terminate station's subscription to a network slice (URLLC slice in this example). The determination may result from terminating an application using the service of the network slice in the apparatus 100. As a result of block 604, a deassociation procedure may be started for the network slice, and the deassociation may be confined only to the network slice. The other network slice(s) and the default connection may be maintained and frame transmissions conducted. If the station initiated the deassociation of step 606, the station may transmit a deassociation request frame comprising the transmitter MAC address of the network slice under deassociation (the MAC address mapped to the URLLC network slice in this example). Upon receiving the deassociation request with the MAC address of the specific (URLLC) network slice as the transmitter MAC address, or with the default MAC address as the transmitter address and the request comprising the MAC address associated with the specific network slice in a payload, the access node may determine that the deassociation is confined to the specified network slice and start the deassociation for only the specified network slice. As a consequence, the access node may perform the deassociation and, optionally, deauthentication for only the specified network slice. Upon completing the deassociation, the access node may transmit a deassociation response frame with an indication of the MAC address of the specified (URLLC) network slice. After the deassociation of the (URLLC) network slice, the channel contention and frame transmissions may continue within the association in other network slice(s) and over the default data connection (block 608).

In a similar manner, new associations to network slices may be performed after the initial association in step 502 and during the association. A conventional association or the association according to step 502 may be performed at first. Even data frame transmission may be performed before performing the association to a new network slice. Upon detecting to request for association to a new network slice, the station 100 may transmit a new association request within the on-going association, wherein the new association request requests for association to the new network slice, and the identifier of the new network slice, e.g. the NSSAI, may be provided in the new association request. The association request may be a reassociation request.

In another embodiment, the network slices remain static for the whole duration of the association. Parameters for the network slices may be configured when establishing the association. Upon changing the configuration(s) of the network slice(s), e.g. changing an availability status of a network slice for the station 100, a reassociation may be carried out to affect the reconfiguration.

The reassociation may be necessary also when the station 100 is mobile and is handed over to another access node. The reassociation may be carried out substantially in the same manner as the association procedure.

In addition to the MAC address, an internet protocol (IP) address of the apparatus 100 or the access node may be used to perform the network slice addressing in the same manner as described above for the MAC address(es).

Figure 7:
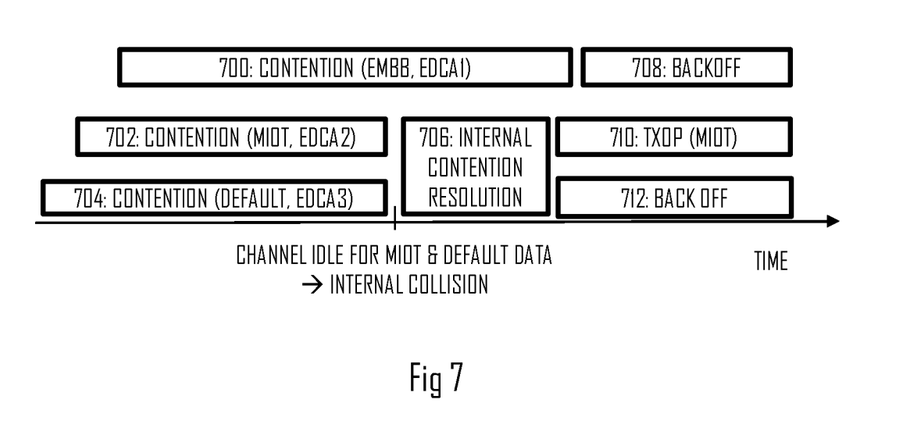
FIG. 7 illustrates an embodiment for performing channel contention for different types of data associated with different network slices.

In the embodiment of FIG. 5, the station is described to perform the channel contention for different network slices and for the default data connection in a sequential manner. The station may then determine schedule the channel contention order, for example on the basis of priorities or access categories of the different data types. In another embodiment, the station performs the channel contention multiple data frames of different data types simultaneously. Referring to FIG. 5, the channel contentions in blocks 504, 512, 520 may be carried out simultaneously or the channel contentions in a subset of blocks 504, 512, 520 may be carried out simultaneously, the subset comprising a plurality of blocks 504, 512, 520. FIG. 7 illustrates an embodiment of such a procedure.

Referring to FIG. 7, let us describe an embodiment where the station 100 performs the channel contention 600 simultaneously for a plurality of data types in separate channel contention processes. The different channel contention processes may employ different channel access parameters, e.g. the EDCA parameters. One process may carry out the channel contention for EMBB data in block 700 using a second set of access parameters (EDCA1 in FIG. 7), another process may carry out the channel contention for MIoT data in block 702 using a first set of access parameters (EDCA2 in FIG. 7), and yet another process may carry out the channel contention for the default data in block 704 using a third set of access parameters (EDCA3 in FIG. 7). As illustrated in FIG. 7, the processes 700 to 704 may start independently and at different times. The channel contention may comply with channel contention specified in 802.11 specifications and comprise channel sensing for a determined time interval. Upon detecting no radio energy in the channel during the time interval, the channel may be deemed to be idle for transmission.

Since the channel contention processes 700 to 704 are independent, they may perform the detection of the channel to idle at the same time, as illustrated in FIG. 7 for the processes 702 and 704. In such a case, a collision between the transmissions occurs. In this case, the station would attempt transmission of MIoT data frame and a default data frame at the same time. Since the collision is internal to the station, the station may employ an internal contention resolution solution for such a case where two processes attempt the frame transmission at the same time. A channel contention manager may be provided in the station that manages contention resolution for the collision in block 706. The channel contention manager may monitor the operation of the processes 700 to 704 and, upon detecting that two processes have detected the channel to be idle and, as a consequence, prepare for frame transmission, the channel contention manager may suspend one of the processes 702, 704. The contention resolution may select the process to be suspended on the basis of the access parameters, for example. A process transmitting higher priority data may be allowed to continue while a process transmitting lower priority data may be suspended. In this example, the contention resolution in block 706 suspends the default data transmission which causes the corresponding process to back off in block 712. The process transmitting the MIoT data was allowed to proceed so the corresponding process acquires a transmission opportunity 710 to transmit the MIoT data. The process still performing the channel contention in block 700 detects the transmission and backs off in block 708.

In any one of the above-described embodiments, the access node 104 may determine whether to allow channel contention or to schedule transmissions for data of a network slice. For example, if there are strict QoS requirements for data of a network slice, e.g. in terms of latency, the access node may employ the scheduling for uplink and/or downlink transmission of the network slice. The access node 104 may then schedule the uplink/downlink transmissions to the MAC address of the network slice, thus limiting the scheduling to only the specific network slice of the station 100 while allowing channel contention for the other type(s) of data of the station 100.

Figure 8:
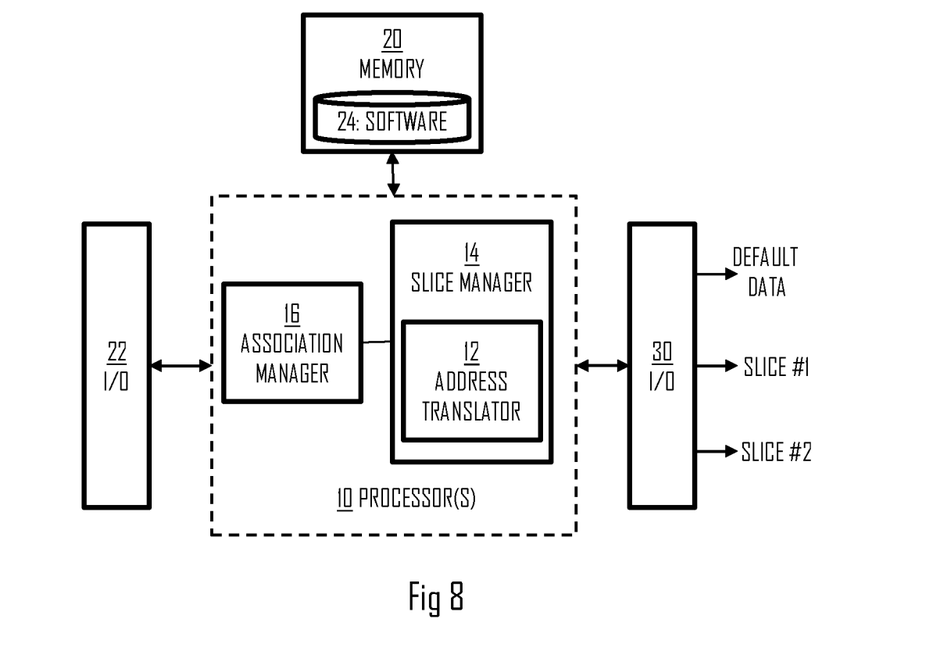
FIGS. 8 and 9 illustrate block diagrams of structures of apparatuses according to some embodiments of the invention.

FIG. 8 illustrates an embodiment of a structure of the above-mentioned functionalities of an apparatus executing the functions of the access node 104 in the process of FIG. 3 or any one of its embodiments. The apparatus may be the access node. In another embodiment, the apparatus carrying out the above-described functionalities of the access node is comprised in such a device, e.g. the apparatus may comprise a circuitry, e.g. a chip, a chipset, a processor, a micro controller, or a combination of such circuitries in the access node. The apparatus may be an electronic device comprising electronic circuitries for realizing some embodiments of the access node.

Referring to FIG. 8, the apparatus may comprise a first communication interface 22 or a communication circuitry configured to provide the apparatus with capability for bidirectional communication with stations over a radio interface. The communication interface may comprise at least one radio modem and radio frequency circuitries for processing received management frames and data frames and management frames and data frames to be transmitted. The communication interface 22 may comprise standard well-known components such as the radio modem, an amplifier, a filter, a frequency converter, and encoder/decoder circuitries.

The apparatus may further comprise a second communication interface 30 or a communication circuitry configured to provide the apparatus with capability for bidirectional communication with other networks such as networks of a cellular communication system and/or the Internet. The communication interface 30 may comprise circuitries for processing messages received from at least one of a plurality of above-described network slices, and for processing messages to be transmitted to the at least one of the plurality of above-described network slices. Additionally, the communication interface 30 may provide a default data connection for the default data type. The communication interface 22 may comprise standard well-known components such as a modem, an amplifier, a filter, a frequency converter, and encoder/decoder circuitries.

The apparatus may further comprise a memory 20 storing one or more computer program products 24 configuring the operation of at least one processor 10 of the apparatus. The memory 20 may further store a configuration database storing operational configurations of the apparatus, e.g. the mappings between the MAC address(es) of the radio interface and respective network slice(s).

The apparatus may further comprise the at least one processor 10 configured to carry out the process of FIG. 3 or any one of its embodiments. Referring to FIG. 8, the processor(s) 10 comprise(s) an association manager 16 and a slice manager 14. The association manager may manage associations in one or more wireless networks managed by the access node and executed blocks 304 and 306, for example. Upon establishing an association to the station 100 and registering the station to one or more network slices, the association manager may inform the slice manager 14 of the registration(s) and, in some embodiments, store the mapping(s) between the MAC address(es) and the respective network slice(s) in the configuration database of the memory 20. Upon receiving the information on the registration, the slice manager may activate an address translator 12 for the station and with respect to the registered network slices. When conducting frame transmissions, the address translator 12 of the slice manager 14 may check the mappings between the MAC address(es) and the respective network slice(s) according to any one of the above-described embodiments to enable the message forwarding correctly, e.g. according to blocks 308 to 314 or according to FIG. 5, for example.

In an embodiment, the apparatus comprises at least one processor and at least one memory 20 including a computer program code 24, wherein the at least one memory and the computer program code are configured, with the at least one processor, to cause the apparatus to carry out the functionalities of the access node according to any one of the embodiments of FIGS. 3, 5, and 6. According to an aspect, when the at least one processor executes the computer program code, the computer program code causes the apparatus to carry out the functionalities according to any one of the embodiments of FIGS. 3, 5, and 6. According to another embodiment, the apparatus comprises the at least one processor and at least one memory 20 including a computer program code 24, wherein the at least one processor and the computer program code 24 perform the at least some of the functionalities of the access node according to any one of the embodiments of FIGS. 3, 5, and 6. Accordingly, the at least one processor, the memory, and the computer program code form processing means for carrying out some embodiments in the access node. According to yet another embodiment, the apparatus carrying out some embodiments in the access node comprises a circuitry including at least one processor and at least one memory 20 including computer program code 24. When activated, the circuitry causes the apparatus to perform the at least some of the functionalities of the access node according to any one of the embodiments of FIGS. 3, 5, and 6.

Figure 9:
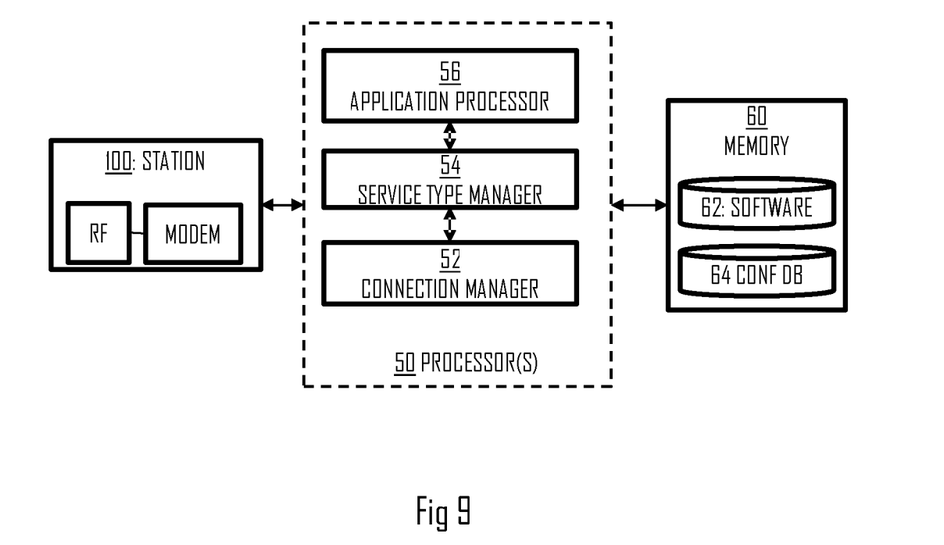

FIG. 9 illustrates an embodiment of a structure of the above-mentioned functionalities of the apparatus 100 executing the process of FIG. 4 or any one of the embodiments performed by the apparatus 100 or the station. Above, term station and term apparatus have been used when referring to the same entity. The station is used in the context where the apparatus operates as a station of a wireless network managed by the access node 104. The apparatus may be the station or, in some embodiments, the apparatus may comprise more than the station. In other embodiments, the apparatus may a circuitry or an electronic device realizing some embodiments of the invention in the station. The station and the apparatus may comply with IEEE 802.11 technology. The apparatus may be or may be comprised in a computer (PC), a laptop, a tablet computer, a cellular phone, a palm computer, a sensor device, or any other apparatus provided with radio communication capability. In another embodiment, the apparatus carrying out the above-described functionalities is comprised in such a device, e.g. the apparatus may comprise a circuitry such as a chip, a chipset, a processor, a micro controller, or a combination of such circuitries in any one of the above-described devices. The apparatus may be an electronic device comprising electronic circuitries for realizing some embodiments of the present invention.

Referring to FIG. 9, the apparatus may comprise a station 120 providing the apparatus with radio communication capability within a wireless network. The station 120 may comprise a radio modem supporting the IEEE 802.11 technology, e.g. any one or more of the following versions: 802.11b, 802.11g, 802.11u, 802.11ac, 802.11ax, 802.11ad, 802.11ay, neighbour awareness networking (NAN). The station 120 may further comprise a radio frequency (RF) front end comprising standard well-known components such as an amplifier, filter, frequency-converter, (de)modulator, and encoder/decoder circuitries and one or more antennas.

The apparatus may further comprise a memory 60 storing one or more computer program products 62 configuring the operation of at least one processor of the apparatus. The memory 60 may further store a configuration database 64 storing operational configurations of the apparatus. The configuration database 64 may, for example, store the network slices and corresponding slice identifiers the apparatus is configured to support. The configuration database may further store the mappings between the network slice(s) and the MAC address(es), as described above.

The apparatus may further comprise the at least one processor 50 managing the operation of the apparatus. The at least one processor 50 may comprise an application processor 56 forming an application layer. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application. The application processor may generate data to be transmitted over the radio interface and receive data through the radio interface. The application processor may output data transfer requests to a connection manager 52. The connection manager 52 may manage the radio connections or associations of the apparatus, e.g. execution of FIG. 4 or any one of its embodiments. The connection manager may also associate the different data types of different network slices with the different MAC addresses by using the mappings in the configuration database 64. A service type manager 54 may be configured to detect the data type of data received from the application processor and to manage the data type separation in the apparatus. The service type manager 54 may take care of the isolation of the different data types using the different network slices in the apparatus. With the help of the service type manager, the connection manager may assign the appropriate MAC address to data such that the data will be addressed to the appropriate network slice.

In an embodiment, the apparatus comprises at least one processor 50 and at least one memory 60 including a computer program code 62, wherein the at least one memory and the computer program code are configured, with the at least one processor, to cause the apparatus to carry out the functionalities of the apparatus 100 according to any one of the embodiments of FIGS. 4 to 7. According to an aspect, when the at least one processor executes the computer program code, the computer program code causes the apparatus to carry out the functionalities according to any one of the embodiments of FIGS. 4 to 7. According to another embodiment, the apparatus comprises the at least one processor and at least one memory 60 including a computer program code 62, wherein the at least one processor and the computer program code 62 perform the at least some of the functionalities of the apparatus 100 according to any one of the embodiments of FIGS. 4 to 7. Accordingly, the at least one processor, the memory, and the computer program code form processing means for carrying out some embodiments of the present invention in the apparatus 100. According to yet another embodiment, the apparatus carrying out some embodiments of the invention in the apparatus 100 comprises a circuitry including at least one processor and at least one memory 60 including computer program code 62. When activated, the circuitry causes the apparatus to perform the at least some of the functionalities of the apparatus 100 according to any one of the embodiments of FIGS. 4 to 7.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2A to 6 may also be carried out in the form of one or more computer processes defined by one or more computer program. A separate computer program may be provided in one or more apparatuses that execute functions of the processes described in connection with the figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus comprising at least one memory and at least one processor, the at least one memory storing computer executable instructions which, when performed by the at least one processor, cause the apparatus to:
receive, from an access node, a scanning message advertising support for network slicing, wherein a network accessed through the access node is divided into logical network slices, and wherein each network slice is associated with a slice identifier;
transmit an association request to the access node, wherein the association request comprises a request for a network slice, and wherein a transmitter address in the association request is a first medium access control (MAC) address of the apparatus and a receiver address in the association request is a first MAC address of the access node;
receive an association response from the access node as a response to the association request, wherein the association response indicates establishment of an association between the apparatus and the access node and comprises an information element indicating granted access to the requested network slice;
transmit, during the association, a first data frame to the access node, wherein the first data frame is addressed to the granted network slice by a MAC address of the first data frame, the MAC address of the first data frame being different from the first MAC address of the apparatus and the first MAC address of the access node; and
transmit, during the association, a second data frame to the access node, wherein the second data frame is not addressed to the granted network slice and comprises the first MAC address of the apparatus and the first MAC address of the access node.

2. The apparatus of claim 1, wherein the MAC address of the first data frame addressing the first data frame to the granted network slice is a second MAC address of the apparatus comprised as a transmitter MAC address of the first data frame, the second MAC address of the apparatus being different from the first MAC address of the apparatus.

3. The apparatus of claim 1, wherein the MAC address of the first data frame addressing the first data frame to the granted network slice is a second MAC address of the access node comprised as a receiver MAC address of the first data frame, the second MAC address of the access node being different from the first MAC address of the access node.

4. The apparatus of claim 1, wherein the apparatus further caused to transmit the first data frame by using a first set of access parameters and to transmit the second data frame by using a second set of access parameters different from the first set of access parameters.

5. The apparatus of claim 4, wherein the first set of access parameters and the second set of access parameters comprise enhanced distributed channel access (EDCA), parameters of IEEE 802.11 technology, and wherein the EDCA parameters of the first set of access parameters are different from the EDCA parameters of the second set of access parameters.

6. The apparatus of claim 1, wherein the MAC address of the first data frame is derived from the slice identifier or wherein the MAC address of the first data frame is derived from a combination of an index of the slice identifier and the first MAC address.

7. The apparatus of claim 1, wherein the apparatus further caused to perform channel contention for said transmitting the first data frame simultaneously with channel contention for said transmitting the second data frame.

8. The apparatus of claim 1, wherein the apparatus further caused to:
request and acquire a grant for a plurality of network slices during the association; and
perform a deassociation procedure for one of the plurality of network slices while maintaining an association to another one of the plurality of network slices, wherein the deassociation terminates data transfer for said one of the plurality of network slices.

9. The apparatus of claim 1, wherein the scanning message is a beacon message, a probe response message, or the association response.

10. The apparatus of claim 1, wherein the slice identifier is Network Slice Selection Assistance Information as specified in 3GPP specifications.

11. An apparatus comprising at least one memory and at least one processor, the at least one memory storing computer executable instructions which, when performed by the at least one processor, cause the apparatus to:
transmit a scanning message advertising support for network slicing, wherein a network provided by the apparatus is divided into logical network slices, and wherein each slice is associated with a slice identifier;
receive an association request from a station, wherein the association request comprises a request for a network slice, and wherein a transmitter address in the association request is a first medium access control (MAC) address of the station and a receiver address in the association request is a first MAC address of the apparatus;
transmit an association response to the station as a response to the association request, wherein the association response indicates establishment of an association between the apparatus and the station and comprises an information element indicating granted access to the requested network slice;
receive, during the association, a first data frame from the station, wherein the first data frame is addressed to the granted network slice by a MAC address of the first data frame, the MAC address of the first data frame being different from the first MAC address of the apparatus and the first MAC address of the station;
forward, on the basis of association between the MAC address and the granted network slice, payload of the first data frame to the granted network slice; and
receive, during the association, a second data frame from the station, wherein the second data frame is not addressed to the granted network slice and comprises the first MAC address of the apparatus and the first MAC address of the station.

12. The apparatus of claim 11, wherein the apparatus further caused to transmit access parameters for each supported network slice, wherein one of the network slices have access parameters that are different from access parameters of another one of the network slices.

13. A method comprising:
receiving, by an apparatus from an access node, a scanning message advertising support for network slicing, wherein a network accessed through the access node is divided into logical network slices, and wherein each network slice is associated with a slice identifier;
transmitting, by the apparatus, an association request to the access node, wherein the association request comprises a request for a network slice, and wherein a transmitter address in the association request is a first medium access control (MAC) address of the apparatus and a receiver address in the association request is a first MAC address of the access node;
receiving, by the apparatus, an association response from the access node as a response to the association request, wherein the association response indicates establishment of an association between the apparatus and the access node and comprises an information element indicating granted access to the requested network slice;
transmitting, by the apparatus during the association, a first data frame to the access node, wherein the first data frame is addressed to the granted network slice by a MAC address of the first data frame, the MAC address of the first data frame being different from the first MAC address of the apparatus and the first MAC address of the access node; and
transmitting, by the apparatus during the association, a second data frame to the access node, wherein the second data frame is not addressed to the granted network slice and comprises the first MAC address of the apparatus and the first MAC address of the access node.

14. The method of claim 13, wherein the MAC address of the first data frame addressing the first data frame to the granted network slice is a second MAC address of the apparatus comprised as a transmitter MAC address of the first data frame, the second MAC address of the apparatus being different from the first MAC address of the apparatus.

15. The method of claim 13, wherein the first data frame is transmitted by using a first set of access parameters and the second data frame is transmitted by using the second set of access parameters different from the first set of access parameters.

16. The method of claim 15, wherein the first set of access parameters and the second set of access parameters comprise enhanced distributed channel access (EDCA) parameters of IEEE 802.11 technology, and wherein the EDCA parameters of the first set of access parameters are different from the EDCA parameters of the second set of access parameters.

17. The method of claim 13, wherein the MAC address of the first data frame is derived from the slice identifier or wherein the MAC address of the first data frame is derived from a combination of an index of the slice identifier and the first MAC address.

18. The method of claim 13, comprising:
requesting and acquiring a grant for a plurality of network slices during the association; and
performing a deassociation procedure for one of the plurality of network slices while maintaining an association to another one of the plurality of network slices, wherein the deassociation terminates data transfer for said one of the plurality of network slices.

19. The method of claim 13, wherein the scanning message is a beacon message, a probe response message, or the association response.

20. The method of claim 13, wherein the slice identifier is Network Slice Selection Assistance Information as specified in 3GPP specifications.

* * * * *